US008583929B2

(12) United States Patent
Patel et al.

(10) Patent No.: US 8,583,929 B2
(45) Date of Patent: Nov. 12, 2013

(54) ENCRYPTION METHOD FOR SECURE PACKET TRANSMISSION

(75) Inventors: Sarvar Patel, Montville, NJ (US); Ganapathy Subramanian Sundaram, Hillsborough, NJ (US)

(73) Assignee: Alcatel Lucent, Paris (FR)

( * ) Notice: Subject to any disclaimer, the term of this patent is extended or adjusted under 35 U.S.C. 154(b) by 1745 days.

(21) Appl. No.: 11/441,969

(22) Filed: May 26, 2006

(65) Prior Publication Data

US 2007/0277035 A1    Nov. 29, 2007

(51) Int. Cl.
*H04L 9/32* (2006.01)

(52) U.S. Cl.
USPC ............. 713/171; 713/161; 713/176; 380/28; 380/255; 726/12; 726/13

(58) Field of Classification Search
None
See application file for complete search history.

(56) References Cited

U.S. PATENT DOCUMENTS

| | | | | |
|---|---|---|---|---|
| 6,185,680 | B1 | 2/2001 | Shimbo et al. | ............... 713/160 |
| 6,226,704 | B1 | 5/2001 | Wang et al. | |
| 7,380,124 | B1 * | 5/2008 | Mizell et al. | .................. 713/171 |
| 2002/0025045 | A1 * | 2/2002 | Raike | ........................... 380/280 |
| 2004/0103277 | A1 * | 5/2004 | Seada et al. | .................... 713/160 |
| 2004/0236965 | A1 * | 11/2004 | Krohn | ........................... 713/201 |
| 2005/0177723 | A1 * | 8/2005 | Huang et al. | .................... 713/168 |
| 2005/0232426 | A1 * | 10/2005 | Konersmann et al. | ........ 380/277 |
| 2006/0078120 | A1 * | 4/2006 | Mahendran et al. | .......... 380/255 |

FOREIGN PATENT DOCUMENTS

| | | |
|---|---|---|
| JP | 08-335040 A | 12/1996 |
| JP | 2000-059356 A | 2/2000 |
| JP | 2000-224158 A | 8/2000 |
| JP | 2001-086110 A | 3/2001 |
| JP | 2004-104559 A | 4/2004 |
| JP | 2005-117511 A | 4/2005 |
| JP | 2006-033334 A | 2/2006 |
| WO | WO 00/33482 | 6/2000 ............. H04B 7/185 |
| WO | WO 2006/039967 A1 | 4/2006 |
| WO | PCT/US2007/012197 | 12/2007 |
| WO | PCT/US2007/012197 | 5/2008 |

OTHER PUBLICATIONS

Xenakis et al., "Security in third Generation Mobile Networks", Elsevier, Dec. 2003, pp. 638-650.*
Xenakis, Christos et al.. "Security in third Generation Mobile Networks", Computer Communciations, Elsevier Science Publishers BV, Amsterdam, NL, vol. 27, No. 7, 1 May 2004, pp. 638-650.
Pending U.S. Appl. No. 09/827226, Filed Apr. 5, 2001 (M. Wong 1).

(Continued)

*Primary Examiner* — Shewaye Gelagay
(74) *Attorney, Agent, or Firm* — Harness, Dickey & Pierce

(57) ABSTRACT

Methods are provided for securely transmitting a packet between endpoints of a network. In one aspect, there is provided a method for establishing an end-to-end key using extant hop-by-hop security associations. In a second aspect, there is provided a method in which a packet-specific encryption key PEK is used to encrypt a packet p. A signature of the key PEK is independently computed at each of two nodes, using an integrity key shared by the two nodes. The signature is sent from one of the two nodes to the other in association with the packet p. The receiving node uses the signature to verify that the packet p was originated by an entity having possession of the PEK.

23 Claims, 7 Drawing Sheets

(56) References Cited

OTHER PUBLICATIONS

Xenakis, Christos et al. "Security in third Generation Mobile Networks", Computer Communciations, Elsevier Science Publishers BV, Amsterdam, NL, vol. 27, No. 7, May 1, 2004, pp. 638-650.
"TISPAN NGN Security Security Architecture—NGN Release 1; Draft ETSI TS 187003", ETSI Standards, European Telecommunications Standards Institute, Sophia-Antipo, FR, No. V 2, 2005.
Jyh-How Huang et al., "A Level Key Infrastructure For Secure And Efficient Group Communication In Wireless Sensor Networks", Proceedings of the First International Conference on Security and Privacy for Emerging Areas in Communications Networks (SECURECOMM 2005), First International Conference on Athens, Greece, Sep. 5-9, 2005, Piscataway, NJ USA, IEEE, pp. 1-12.
Japanese Office Action mailed Jul. 30, 2013, issued in Japanese Application No. 2012-096264, with English translation.

* cited by examiner

ENCRYPTION METHOD FOR SECURE PACKET TRANSMISSION

FIELD OF THE INVENTION

This invention relates to security and authentication in wireless systems, and more particularly to wireless systems adapted for sending and receiving packet data.

ART BACKGROUND

Modem wireless systems, such as those of the third generation and beyond, are being adapted to send and receive packet data at transfer rates of hundreds, and even of thousands, of kilobits per second. By way of illustration, FIG. 1 shows the high-level architecture of one type of third-generation wireless system, referred to as "UMTS" for "Universal Mobile Telecommunications System." As seen in the figure, mobile user terminal 10 communicates over an air interface with base station 20. A base station may also be referred to in this context as a "Node B". Base station 20 communicates with a backhaul network 30, which includes Radio Network Controller (RNC) 40, Authentication Center (AuC) 50, Mobile Switching Center (MSC) 60, and element 70, which as shown combines the functions of SGSN and GGSN.

The RNC controls a set of base stations that are connected to it. Its function is to manage radio resources. For example, it controls the set-up and tear-down of calls and the processing of voice and data traffic. It also manages hard and soft handoff between cells.

The AuC authenticates each user who tries to log onto the network. More specifically, the AuC authenticates the SIM card located in the entering user's terminal. For each subscriber, a unique secret key is shared between the subscriber and the AuC. The AuC challenges the entering subscriber by sending him a random number which is to be hashed or encrypted with the shared key, and the result returned to the AuC. If the result that has been returned matches the AuC's own result from the same operation, the user will be admitted to the network. The secret information which is shared between the AuC and the user is also used to create a ciphering key CK which provides security when the user and the base station communicate with each other over the air.

It should be noted in this regard that according to other standards, such as certain North American CDMA standards, the cellphone which operates as a user terminal does not include a SIM card. Instead, an electronic serial number (ESN) is inscribed in the cellphone hardware by the manufacturer. In addition, the wireless carrier may identify the cellphone by a mobile identification number (MIN). The ESN and the MIN may be used together for identification, and may be used in procedures for authentication and security. It should further be noted that according to certain standards, including certain North American standards for 3GPP2, functions similar to those of the AuC may be carried out by a network element referred to as the "AAA server", in which "AAA" stands for "Authentication, Authorization, and Accounting."

Turning again to FIG. 1, the MSC is a telephone exchange that supports, among other things, circuit-switched calling and mobility management for users who are roaming within its service area. Data can be delivered directly to the MSC from the wired network in digitally encoded form. As seen in the figure, the MSC connects to the public switched telephone network (PSTN). The AuC acts indirectly through the MSC to perform its authentication function.

The SGSN ("Serving GPRS Support Node") tracks the locations of the user terminals within its service area, supports billing and security functions, tunnels downlink packets toward the RNC, and detunnels uplink packets from the RNC. The tunneling and detunneling of packets are in accordance with the GPRS Tunneling Protocol (GTP), which among other things makes it possible for mobile users to maintain connection to the internet while moving from place to place.

The GGSN ("Gateway GPRS Support Node") functions as an IP router with respect to external packet data networks. As seen in the figure, for example, the GGSN connects to the "IP network." The GGSN also supports security and billing functions. In accordance with GTP, the GGSN makes the conversion between the ordinary IP packets transported on the external packet networks, and the GTP packets that are tunneled within the UMTS core network. To the external packet network, it appears as though the user, although possibly moving from place to place, is fixed at the GGSN.

It should be noted in this regard that according to other standards, such as certain North American CDMA standards, the RNC is connected to a PDSN instead of an SGSN. The PDSN in turn is connected to a Home Agent (HA). Also, the tunneling protocols used for communication between the PDSN and the RNC and over to the Base Station do not involve GTP. Other systems and standards, such as the IEEE 802.16 based WiMAX system, use a different hierarchy consisting of base stations connected to an Access Gateway (AGW). Overall, the functionality is similar although the details are different.

The base station is typically in an exposed location, and therefore relatively insecure against physical intrusion. On the other hand, the RNC, MSC, SGSN, and GGSN are typically situated in central offices, where sensitive network information can be protected against eavesdropping, tampering, sabotage, and theft.

Thus, the execution of security-related functions is confined to those network elements that are physically secure, whereas the base station acts only to forward encrypted data, without decoding the encrypted messages. Because it is assumed that the physically secure network elements are interconnected by a network that is likewise secure, there are generally no mandatory requirements to additionally set up secure tunnels between those network elements.

Various advanced architectures have been proposed, which may lead to greater exposure, and less physical security, at certain network elements. For example, a flat IP architecture such as the BSR (Base Station Router) architecture integrates most of the functionality of the RNC, SGSN, and GGSN into the base station. (Another version of the BSR architecture relates to the SAE/LTE architecture rather than the UMTS architecture. In this second type of BSR, the eNB, MME, and UPE are integrated into the base station. The preceding abbreviations respectively stand for "enhanced Node B", "Mobility Management Entity", and "User Plane Entity.")

Thus, FIG. 2, for example, shows mobile user 80 in radio communication with BSR 90, which connects in turn to a backhaul network including AuC 100, SIP server 110, an IP network, and the PSTN. As seen in the figure, the IP network connects the BSR to the AuC and the SIP server. SIP ("Session Initiation Protocol") is an internet signaling protocol for VoIP ("Voice over IP") as well as other types of interactive user sessions involving multiple kinds of media. In the figure, the SIP server block is meant to represent all the support functions for VoIP and the like.

In the BSR and similar architectures, encryption and other security-related functions, and even keys and other sensitive information, may reside at physically exposed locations.

Moreover, the BSR might make external connections through a public IP network that is vulnerable to eavesdropping and tampering. Because of such increased exposure, there is a need for new safeguards against malicious activity.

However, because physical protection of the backhaul network cannot be guaranteed, it is desirable for such new safeguards to be logically based, at least in part. On the other hand, a new logically based safeguard may face opposition because, e.g., it is incompatible with some wireless standards, or because while conforming to wireless standards it is incompatible with internet standards.

Thus one need, in particular, is for a safeguard against malicious attacks that is effective end-to-end, i.e. between a wireless user terminal and a node of the IP network, or between two wireless user terminals connected via the IP network, and which moreover can be implemented without major changes to existing IP standards.

SUMMARY OF THE INVENTION

We have developed such a safeguard. Accordingly, our invention involves transmitting a packet p between two endpoint nodes, designated A and B, in a network of nodes interconnected by links.

According to a first aspect of our new development, an end-to-end key is established using extant hop-by-hop security associations. To send information "end-to-end" in this regard means to send it between any pair of network entities where there is a transition from one type of network or protocol to another, from one subscriber network to another, or from one service provider to another, or where a user terminal is situated, or where there is any other kind of endpoint for a message.

For example, A establishes an end-to-end key Packet Encryption Key (PEK) with B. Information needed to establish the key is securely transferred between A and B by using extant hop-by-hop security associations. The key PEK is packet-specific. The packet p is encrypted with the key PEK and transmitted from A to B.

In specific examples, the key PEK is generated at A and transmitted through the network to B.

In other specific examples, A establishes a session with B. By "session" is meant a mutual agreement for the exchange of data packets between entities having distinct IP addresses for a period of time having a beginning and an end. A and B both obtain at least one session key SEK. For example, A may create a session key SEK and send it to B. Then, A and B each independently create the packet-specific encryption key PEK from at least the session key SEK and from a unique property of the packet p using a known algorithm. The session key is securely sent from A to B using extant hop-by-hop security associations.

At least one hop of the network path from A to B may take place between a pair of nodes that share an integrity key. For example, A may be a wireless user terminal that shares an integrity key with its serving base transceiver node. Similarly, B may also be a wireless user terminal that shares an integrity key with its serving base transceiver node. By "base transceiver node" is meant a base station, node-B, base transceiver station, BSR, or any other element of a wireless network having a similar function.

A second aspect of our new development involves a method in which a packet-specific encryption key PEK is used to encrypt a packet p. A signature of the key PEK is independently computed at each of two nodes, using an integrity key shared by the two nodes. The signature is sent from one of the two nodes to the other in association with the packet p. The receiving node uses the signature to verify the packet p.

In this regard, to "verify" the packet means to verify that the originator of the packet had possession of the PEK. It should be noted that verification of a packet in this sense does not necessarily guarantee that the packet is free of unauthorized modification, as by tampering, for example.

In specific examples, the nodes that share an integrity key are a wireless user terminal and the base transceiver node that serves it.

In specific examples, the packet p is sent from a first wireless user A through a network to a second wireless user B. User A and the base transceiver node that serves it use a signature of the key PEK to verify the authenticity of the packet p, and likewise for User B and the base transceiver node that serves it.

DETAILED DESCRIPTION

For illustrative purposes, we will describe an example in which our new methods are applied in the context of a UMTS network. However, it should be noted that the methods to be described are more general in application. For example, they may be applied in the context of wireless services that comply with any of a broad range of standards, of which the GSM and UMTS standards are only two examples. Furthermore, they may be applied in contexts in which the access technology is wireline, as well as those in which it is wireless. Still further, our methods are usefully applied in the context of services of various kinds, which may include, for example, conventional wireless services as well as application-level services such as Voice over IP (VoIP). Still further, the security enhancements that our methods may provide may relate to security between access terminals as hardware entities, or they may with equal advantage relate to security between users, i.e., between human beings who are identified as subscribers to a service.

As noted above, the Authentication Center (AuC) in a UMTS network authenticates the SIM card located in the terminal of a subscriber attempting to sign onto the network. The authentication process relies on a secret key that is shared between the subscriber and the AuC. More specifically, a static key referred to as the "root key" is stored within the subscriber's SIM card, and is also stored within the wireless network. In typical UMTS networks, the root key is stored in the AuC, but may be stored in other network elements such as the Home Location Register (HLR). The user terminal and the network each locally generate the ciphering key CK, as well as an integrity key IK, from the root key. It should be noted that various other wireless standards, such as those for GSM, TDMA, and CDMA systems, describe similar procedures for authentication and security.

Figure 1:
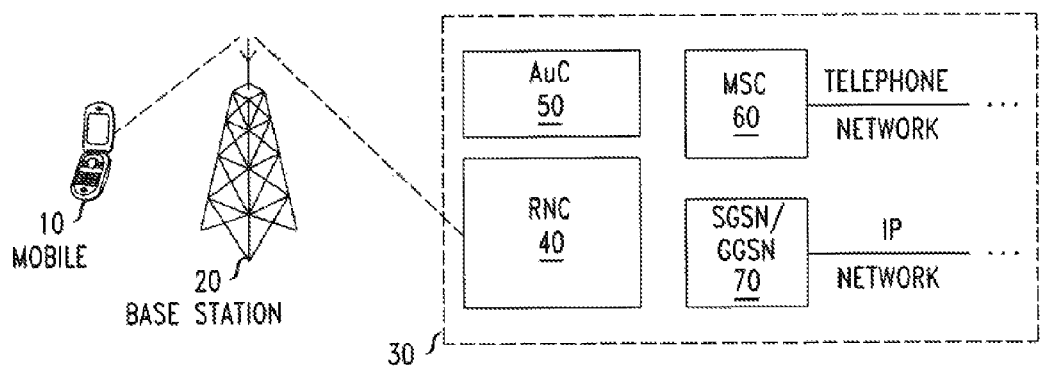
FIG. 1 is a high-level block diagram of the architecture of a UMTS system of the prior art.
Figure 2:
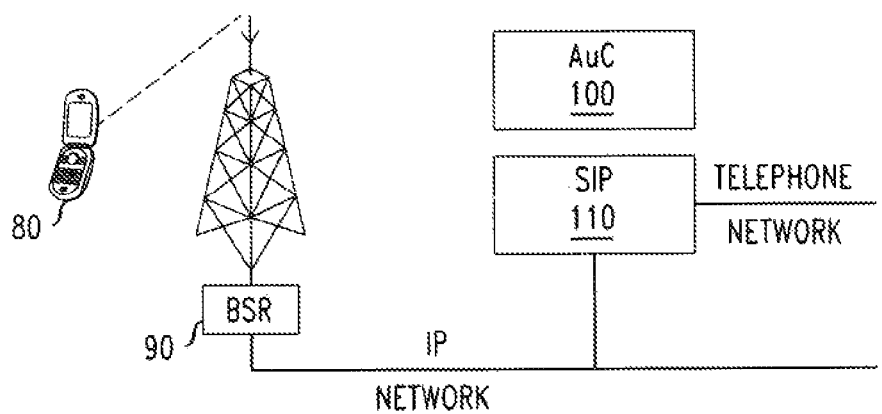
FIG. 2 is a high-level block diagram of a wireless system using a BSR.
Figure 3:
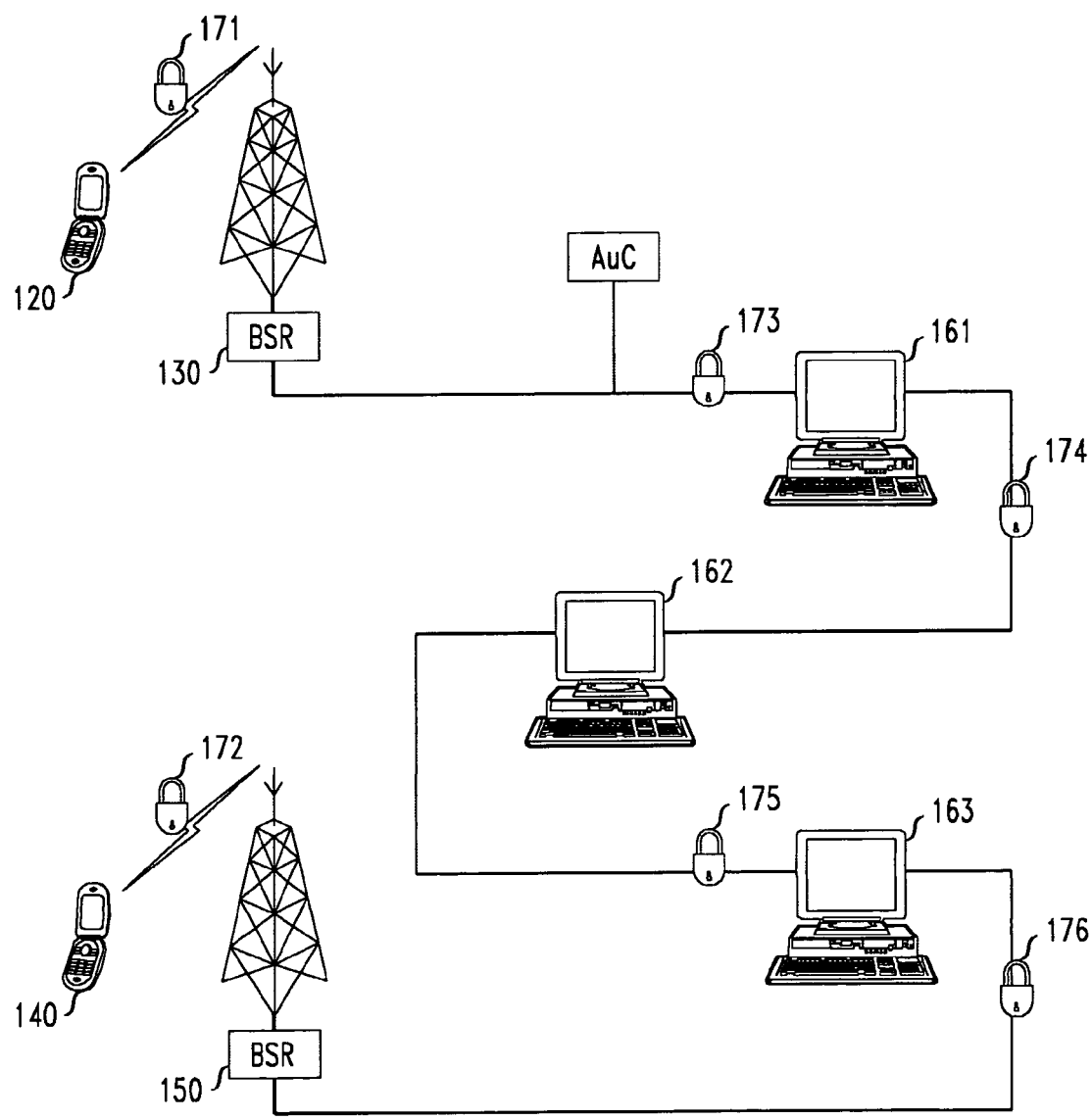
FIG. 3 is a high-level block diagram in which two mobile user terminals are connected to each other through respective BSRs which communicate with each other via multiple hops through an IP network.

In an illustrative scenario, as shown in FIG. 3, user terminal 120 authenticates itself to the network as e.g. described above, via communications over the air with BSR 130. Terminal 120 then establishes a session with user terminal 140, which is served by BSR 150. The procedures by which the session is established will typically be conducted according to well-known standards, and therefore need not be described here in detail. Examples of such standards, in the broadband wireless context, are the 3GPP and 3GPP2 standards, as well as the IEEE 802.16 WiMax standard.

In the figure, the IP network over which the BSRs communicate with each other is represented by three servers 161, 162, 163. The figure is provided purely for pedagogical purposes, and should not be understood as limiting as to the number of nodes or servers in the IP network or the number of users or BSRs, or in any other sense.

Communications between user terminal 120 and BSR 130 are advantageously protected by encryption. As explained above, in a UMTS system, for example, such communications will typically be protected by encrypting them with the ciphering key CK, and by using a further key IK to assure the integrity of messages exchanged between the user terminal and the BSR. Other node pairs consisting of a wireless user terminal and the BSR that serves it will likewise have their own ciphering key and integrity key. Thus, for example, the link between terminal 120 and BSR 130 is shown in the figure as protected by key 171, which more generally may be a vector of keys. Likewise, the link between terminal 140 and BSR 150 is protected by key 172.

The IP network, or other network, through which BSR 130 and BSR 150 communicate, may also use encryption to protect the messages that are sent through it. There are various IETF standards, for example, that describe the use of encryption for such purposes. For example, the IPSec (Internet Security) architecture described in IETF standards documents includes protocols such as Encapsulating Security Payload (ESP) for encrypting data within the packet payload.

Typically, each hop will be protected by a different ciphering key. Thus, by way of example, FIG. 3 shows each link of the IP network as protected by a respective one of keys 173-176.

It will generally be advantageous for communication between network nodes, such as user terminals 120 and 140 of FIG. 3, to use the hop-by-hop security measures described above. We will now describe further security measures, which offer enhanced protection against eavesdropping and tampering at exposed points in the network.

Figure 4:
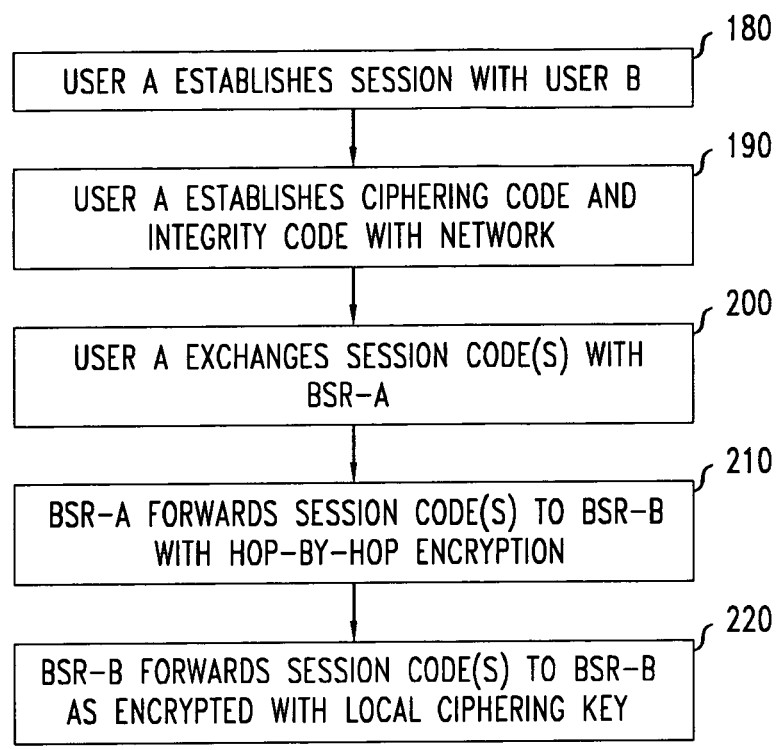
FIG. 4 is a flowchart of an exemplary procedure by which a user initiates a session and distributes a session code to the target user.

Turning to the procedure described in FIG. 4, it will be seen that an initiating user, now denominated "User A," wishes to establish a session with a target user, now denominated "User B." More generally, the initiating and target nodes may be any nodes in the network, and are not limited to wireless user terminals or the like. At block 180, the session is established according to well-known methods. At block 190, a ciphering key $CK_{A,BSR-A}$ and integrity key $IK_{A,BSR-A}$ are established between User A and its serving BSR, now denominated "BSR-A," as described above. It should be noted in this regard that this procedure is described in the context of BSR networks purely for illustrative purposes and not for purposes of limitation, and that it will find useful application in various kinds of communication network.

A session key SEK is now generated and exchanged between User A and BSR-A, as indicated at block 200. More generally, the session key may be a vector of two or more keys. For example, the vector of keys may include one or more keys for encrypting sessions, and one or more other keys for authenticating packets. For simplicity, we will refer to a single session key SEK, but it should be borne in mind that in fact a vector of two or more keys may be used.

The session key SEK will typically be generated by User A and transmitted to BSR-A under the protection of the ciphering key established between them. However, other arrangements are also possible. For example, BSR-A might generate the key and send it to User A, or a third party might distribute the key to both User A and BSR-A, or User A and BSR-A might each compute the key locally using a pre-arranged algorithm and a shared piece of data. In any event, algorithms for generating session keys are well known, and need not be described here in detail. For example, suitable algorithms are described in the 3GPP and 3GPP2 standards. One specific example is provided by the Enhanced Cryptographic Algorithms (ECA) described in the 3GPP2 standard.

As indicated at blocks 210 and 220 of FIG. 4, the session key is forwarded to BSR-B and to User B under the protection of hop-by-hop encryption. That is, the session key is protected on each hop by a ciphering key provided in accordance with the security associations between the endpoints of that hop. As a consequence, the session key may be decrypted at each intermediate node, such as each of nodes 161-163 of FIG. 3, and then reencrypted according to the security association between the current node and the next node. Over the last hop, from BSR-B to User B, the session key will typically be encrypted using the ciphering key that was established when User B authenticated itself to the network.

Figure 5:
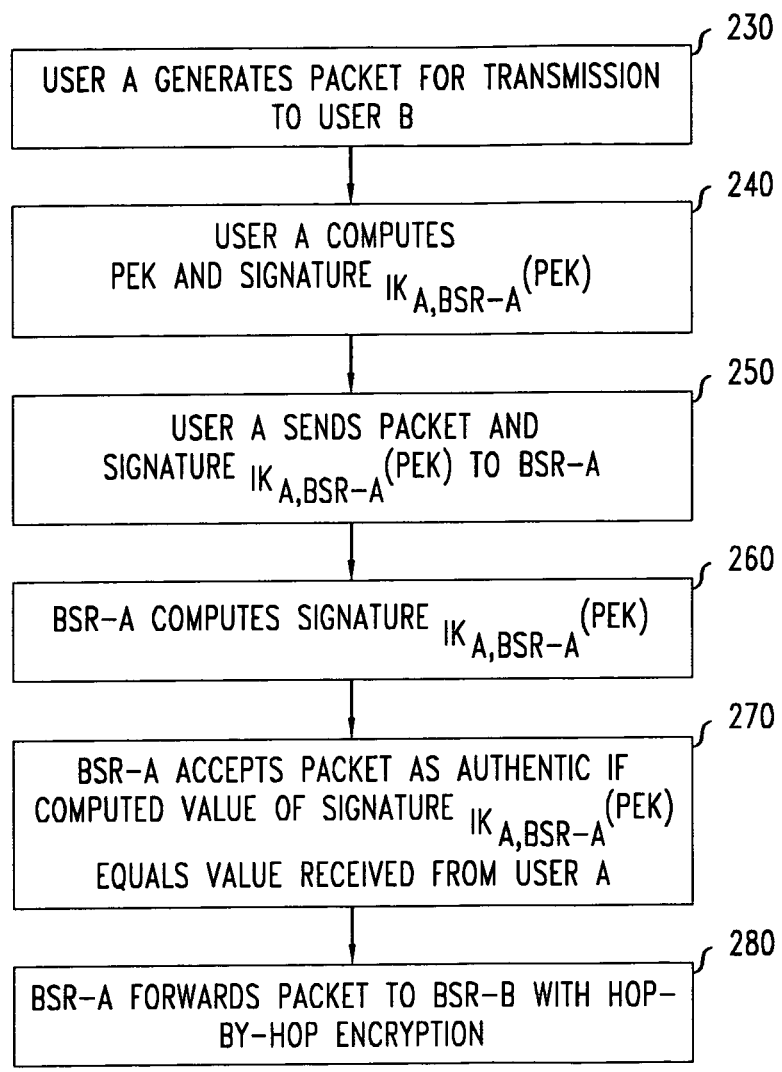
FIG. 5 is a flowchart of an exemplary procedure by which the initiating user sends a packet to the target user.

Turning to FIG. 5, it will be seen at block 230 that User A now generates a packet which is to be transmitted to User B. For each such packet that is to be transmitted, User A computes a packet encryption key PEK that is specific to that packet and no other. For example, the key PEK may be computed from inputs that include the session key and a unique property of the packet. One property of the packet that may be used is a sequence number or synchronized counter value. Thus, for example, the key PEK may be generated by performing a logical operation, such as XOR, between the counter value and the session key. In the event that there are multiple session keys, one session key in particular may be designated to be used for generating the keys PEK. As will be seen, the key PEK for each packet will also be locally computed at BSR-A, BSR-B, and User B.

As indicated at block 240 of FIG. 5, User A also computes a signature of the key PEK, which we denote by $SIGNATURE_{IK_{A,BSR-A}}(PEK)$. Of course, other inputs may also be involved in the signature computation, such as random numbers, cryptographic synchronization parameters, subscriber profile ID (SPID), and the like. In particular, parameters that are not necessarily secret, but that are time-dependent, may be involved.

As indicated at block 250, User A sends the signature to BSR-A in association with the corresponding packet. The signature may be attached to the packet, e.g. as part of a header. Alternatively, the signature could be sent as an out-of-band transmission, e.g. in a control channel. As indicated at block 260, BSR-A independently performs a local computation of $SIGNATURE_{IK_{A,BSR-A}}(PEK)$.

As noted above, $SIGNATURE_{IK_{A,BSR-A}}(PEK)$ may be computed using the integrity key that is shared between the two nodes that are involved, which in this instance is the integrity key shared between User A and BSR-A. The signature $SIGNATURE_{IK_{A,BSR-A}}$ (PEK) will typically be shorter than PEK. For example, it may be the result of a cryptographic compression or hash function. Such a function may take PEK as input, together with other quantities, such as random nonces and counter values, that are known to the entities that rightfully share the knowledge of PEK. Such functions are well known in the art and need not be described here in detail. One example of a function useful in this context is Secure Hash Function 1 (SHA-1), which is used in the HMAC standard of the IETF.

The purpose of a signature such as $SIGNATURE_{IK_{A,BSR-A}}$ (PEK) is to verify that the sender of the packet over a given link was in possession not only of the packet, but also of the key PEK and of the key used to create the signature. It would of course be possible to compute a signature of a larger block of data, such as the packet payload. However, the PEK signature is advantageous because it provides effective packet verification while significantly reducing the demand on computational resources at the user terminals and BSRs.

In the example network described above, the given link may be the link from User A to BSR-A, or as will be seen, the link from BSR-B to User B. Because these links are over the air, they may be particularly vulnerable to attacks in which a spurious packet is injected into a session, or an old packet is reinjected into the session, e.g. after it has been modified. Because PEK is not transmitted, it cannot be intercepted by an attacker. Instead, the attacker would have to compute it, but this is possible only in the unlikely event that the session code is intercepted, together with other information. Thus, interloping packets may be detected and rejected at the receiving end of the link. Accordingly, as indicated at block 270, BSR-A will accept the packet as authentic only if the locally computed value of $SIGNATURE_{IK_{A,BSR-A}}$ (PEK) matches the value received from User A. If the packet is accepted, BSR-A then forwards the packet through the network to BSR-B, as indicated at block 280. Each pair of adjacent nodes on the path taken by the packet through the network may share a unique ciphering key. Accordingly, the packet may be decrypted after each hop, and reencrypted with the new key prior to the next hop.

Typically, the content of the packet will be inaccessible to all of the intermediate nodes, because it will have been encrypted by User A using the key PEK. That is, even if the key PEK is distributed through the network (either directly or by distributing inputs such as SEK for generating PEK), knowledge of PEK can be denied to the intermediate nodes. For example, a secure IPSec tunnel may be established between BSR-A and BSR-B, or BSR-A and BSR-B may share a Central Security Server. By those or similar means, secure key distribution is readily accomplished. Of course, IPSec tunnels and the like could be used for secure transmission of all the packets of a session. However, such intense use of cryptographic protocols could place an intolerable burden on the computational resources at the intermediate nodes. Such a burden is avoided by, for example, using an IPSec tunnel only once per session, solely for key distribution.

The use of a Central Security Server or IPSec tunnel as described above, is one example of key distribution using extant hop-by-hop security associations. It is noteworthy in this regard that after the key distribution is completed, the Central Security Server need not be involved in routing packets belonging to the pertinent session. Thus, only limited use is made of the Central Security Server.

Figure 6:
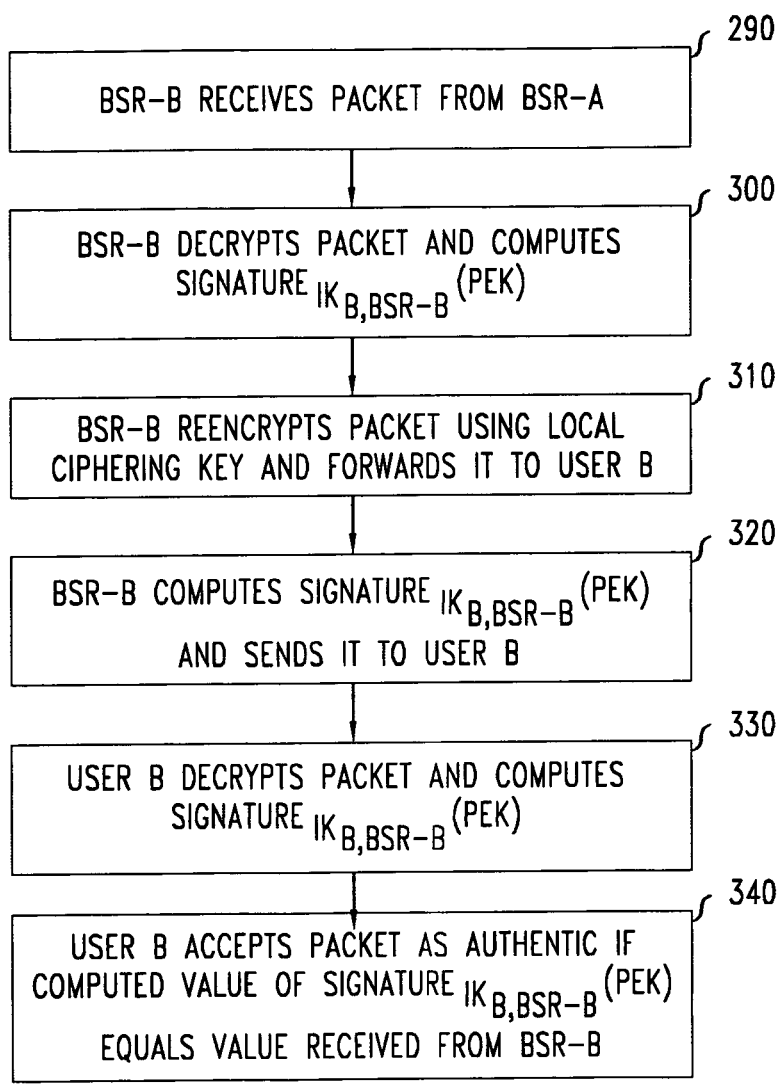
FIG. 6 is a flowchart of an exemplary procedure by which the target user and the BSR that serves it authenticate the packet sent by the initiating user.

The sequence of steps illustrated in FIG. 6, to which attention is now directed, begins at block 290 with receipt of the packet by BSR-B. The packet will typically arrive as encrypted with the ciphering key that BSR-B shares with the preceding node. Accordingly, as indicated at block 300, BSR-B decrypts the packet relative to that ciphering key.

As further indicated at block 300, BSR-B independently performs a local computation of $SIGNATURE_{IK_{B,BSR-B}}$ (PEK). Typically, this computation will be similar to the computation of $SIGNATURE_{IK_{A,BSR-A}}$ (PEK). However, the integrity key between BSR-B and User B will be used as input instead of the integrity key between BSR-A and User A.

At block 310, BSR-B reencrypts the packet using the ciphering key that it shares with User B, and forwards it to User B. As indicated at block 320, BSR-B also sends $SIGNATURE_{IK_{B,BSR-B}}$ (PEK) to User B in association with the packet, through either an in-band or an out-of-band transmission as discussed earlier in reference to the signature $SIGNATURE_{IK_{A,BSR-A}}$ (PEK). At block 330, BSR-B decrypts the packet and performs an independent, local computation of $SIGNATURE_{IK_{B,BSR-B}}$ (PEK). If the locally computed value matches the value sent by BSR-B, the packet will be accepted as verified, i.e., as a packet verified to have been originated by an entity having possession of the PEK.

As noted above, the PEK for each packet may be locally computed at the start and end nodes of the first hop and at the start and end nodes of the last hop. A session key is used as input for computing the PEK. The session key is transmitted through the network in encrypted form, using extant hop-by-hop security associations.

In other examples, however, the session key is optional, and the PEK is forwarded through the network using hop-by-hop encryption. For example, User A (as an example of an initiating node) encrypts the packet, or at least the packet payload, with PEK. User A also encrypts PEK, using the ciphering key that it shares with BSR-A (as an example of the end node of the first hop), and signs PEK using the integrity key that it shares with BSR-A. The encrypted PEK and its signature are sent from User A to BSR-A in association with the packet, as described above in reference to the signature $SIGNATURE_{IK_{A,BSR-A}}$ (PEK).

Figure 7:
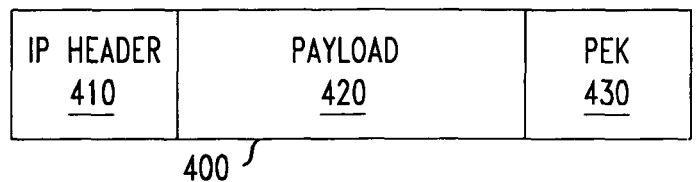
FIG. 7 is a schematic diagram of a packet format that may be used in connection with certain of the methods to be described below.

With reference to FIG. 7, for example, packet 400 includes IP header 410, payload 420, and PEK field 430. Payload 420 is encrypted end-to-end with PEK.

The PEK is sent through the network from BSR-A to BSR-B along with the packet, using hop-by-hop encryption. Thus, PEK may be decrypted and reencrypted at each intermediate node, but without decryption of the packet at the intermediate nodes. In typical packets, the payload in field 420 may be 1500 bytes long, whereas the encrypted PEK in field 430 may be only 128 bits long. Thus, it will be clear that decrypting and reencrypting only the PEK saves a great deal of computational resources.

In the example of FIG. 7, the contents of PEK field 430 are encrypted with the ciphering key $CK_{A,BSR-A}$ on the first hop, i.e., the hop from User A to BSR-A. On each hop of the path from BSR-A to BSR-B, the contents of field 430 are encrypted with, e.g., the pertinent IPSec key. Thus, if there are two or more such hops, a chain of IPSec associations may be used to protect the PEK.

At BSR-B, PEK is encrypted using the ciphering key $CK_{B,BSR-B}$ that BSR-B shares with User B, and signed using the integrity key that BSR-B shares with User B. The encrypted PEK is sent from BSR-B to User B in field 430, and the PEK signature is sent from BSR-B to User B in association with the packet.

If the SEK is to be forwarded through the network, the forwarding may be carried out by any of various possible techniques. According to one such technique, the first traffic packet of a new session is sent with at least its payload encrypted with the pertinent PEK. When User A sends the packet to BSR-A, it attaches the SEK, as encrypted by the ciphering key which User A shares with BSR-A. BSR-A decrypts the SEK and distributes it to BSR-B using extant security associations. When BSR-B sends the packet to User B, it attaches the SEK, as encrypted by the ciphering key which User B shares with BSR-B.

According to one of various alternative techniques, the SEK is distributed during call set-up using the pertinent protocols. For example, SEK may be distributed along with SIP (Session Initiation Protocol) messages for setting up a VoIP call or, e.g., a service based on IMS (IP Multimedia Subsystem).

What is claimed is:

1. A method comprising:
    establishing an end-to-end key for secure transmission of a packet through a network from a first to a second endpoint;
    encrypting the packet with the end-to-end key; and
    transmitting the packet from the first to the second endpoint;
    wherein the establishing the end-to-end key includes transmitting a secret key through the network from the first to the second endpoint under the protection of two or more hop-by-hop security associations, and
    wherein the end-to-end key is identical to the transmitted secret key or is separately derivable therefrom at each of said endpoints.

2. The method of claim 1, wherein the end-to-end key is a packet-specific encryption key.

3. The method of claim 1, wherein establishing the end-to-end key comprises transmitting the key from the first to the second endpoint.

4. The method of claim 1, wherein the end-to-end key is a packet-specific encryption key, and establishing the end-to-end key includes transmitting a session encryption key from the first to the second endpoint, such that the packet-specific encryption key is computed from the session encryption key and packet-specific information.

5. The method of claim 1, wherein at least one endpoint is a wireless user terminal which participates in a security association based at least in part on one or more cryptographic keys shared between said terminal and a base transceiver node.

6. The method of claim 1, wherein establishing the end-to-end key comprises transmitting information through the network as part of a traffic packet.

7. The method of claim 1, wherein establishing the end-to-end key comprises transmitting information through the network in association with call set-up messages.

8. The method of claim 1, wherein the end-to-end key is a packet-specific encryption key, and the method further comprises:
    computing a signature of the packet-specific encryption key using an integrity key shared with a node of the network situated intermediate the first and second endpoints;
    transmitting the packet from the first to the second endpoint via the intermediate node; and
    transmitting the signature to the intermediate node in association with the transmitted packet.

9. A method to be performed at a receiving node of a network, comprising:
    receiving a session encryption key from a prior node of the network under protection of a security association with said prior node, wherein the session encryption key is forwarded through an end-to-end path from an originating node at least two hops distant from the receiving node;
    receiving from said prior node a forwarded packet having a payload portion that is encrypted with a packet-specific encryption key, wherein the packet is forwarded through the end-to-end path from said originating node; and
    locally computing the packet-specific encryption key from inputs which comprise the session encryption key and information specific to the forwarded packet.

10. The method of claim 9, further comprising using the locally computed packet-specific encryption key to decrypt the packet.

11. The method of claim 9, further comprising using an integrity key shared with another node of the network to locally compute a signature of the packet-specific encryption key.

12. The method of claim 11, wherein the integrity key is shared with said preceding node, and the method further comprises comparing the locally computed packet-specific encryption key signature with a packet-specific encryption key signature received in association with the packet, thereby to verify the packet.

13. The method of claim 11, wherein the integrity key is shared with a subsequent node of the network, and the method further comprises:
    forwarding the packet to the subsequent node; and
    transmitting the locally computed packet-specific encryption key signature to the subsequent node in association with the packet, thereby to verify the packet to the subsequent node.

14. A method for processing a packet in a network which includes a first node and a second node that share an integrity key, the method comprising:
    transmitting the packet from the first node to the second node such that at least a payload portion of the packet is encrypted with a packet-specific encryption key, the packet including the packet-specific encryption key;
    computing a signature of the packet-specific encryption key to be used for verifying the packet, wherein said signature computation is carried out using the integrity key; and
    transmitting the packet-specific encryption key signature to the second node in association with the packet, wherein the packet and the signature traverse through the network at least two hops from the first node to the second node.

15. The method of claim 14, wherein the first node is a wireless user terminal and the second node is a base transceiver node.

16. The method of claim 14, wherein the first node is a base transceiver node and the second node is a wireless user terminal.

17. The method of claim 14, wherein the packet-specific encryption key signature is a cryptographic compression function or a hash function evaluated on the packet-specific encryption key.

18. A method for processing a packet in a network which includes a first node and a second node that share an integrity key, the method comprising, at the second node:
    receiving the packet from the first node such that at least a payload portion of the packet is encrypted with a packet-specific encryption key, the packet including the packet-specific encryption key;
    receiving a signature of the packet-specific encryption key from the first node;

computing a signature of the packet-specific encryption key, said computation carried out using the integrity key;

comparing the computed key signature with the received key signature; and if the computed key signature agrees with the received key signature, accepting the packet as verified, wherein the packet and the signature traverse through the network at least two hops from the first node to the second node.

19. The method of claim 18, further comprising using the packet-specific encryption key to decrypt the packet.

20. The method of claim 18, further comprising forwarding the packet toward a destination if the packet was accepted as verified.

21. The method of claim 18, wherein the first node is a wireless user terminal and the second node is a base transceiver node.

22. The method of claim 18, wherein the first node is a base transceiver node and the second node is a wireless user terminal.

23. The method of claim 18, wherein the packet-specific encryption key signature is a cryptographic compression function or a hash function evaluated on the packet-specific encryption key.

* * * * *